United States Patent
Heinzler et al.

(10) Patent No.: US 12,332,651 B2
(45) Date of Patent: Jun. 17, 2025

(54) CONTROL OF A VEHICLE VIA REFERENCE SENSOR DATA

(71) Applicant: ZF Friedrichshafen AG, Friedrichshafen (DE)

(72) Inventors: Andreas Heinzler, Ravensburg (DE); Carolin Heller, Achberg (DE); Markus Birk, Friedrichshafen (DE); Gabriela Jager, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/313,358

(22) Filed: May 6, 2021

(65) Prior Publication Data
US 2021/0356969 A1    Nov. 18, 2021

(30) Foreign Application Priority Data

May 18, 2020    (DE) .................. 10 2020 206 207.2
Aug. 14, 2020    (DE) .................. 10 2020 210 351.8

(51) Int. Cl.
G05D 1/00    (2024.01)

(52) U.S. Cl.
CPC ......... G05D 1/0229 (2013.01); G05D 1/0033 (2013.01); G05D 1/0088 (2013.01); G05D 1/0212 (2013.01)

(58) Field of Classification Search
None
See application file for complete search history.

(56) References Cited

U.S. PATENT DOCUMENTS

| 10,613,540 | B2 * | 4/2020 | Sarkar | B62D 15/0265 |
| 2014/0371973 | A1 | 12/2014 | Pfaff et al. | |
| 2016/0041557 | A1 * | 2/2016 | Trout | G01C 21/206 701/25 |
| 2016/0364004 | A1 * | 12/2016 | Ekandem | G06V 40/28 |
| 2017/0357270 | A1 * | 12/2017 | Russell | B25J 9/162 |
| 2018/0065618 | A1 * | 3/2018 | Nishimine | B60W 10/10 |
| 2018/0203445 | A1 * | 7/2018 | Micks | G06F 30/20 |
| 2019/0084559 | A1 * | 3/2019 | Sim | B60W 60/0015 |
| 2019/0256141 | A1 * | 8/2019 | Stroebel | B62D 15/0285 |
| 2019/0270451 | A1 * | 9/2019 | Liu | B62D 15/025 |

FOREIGN PATENT DOCUMENTS

| DE | 34 08 720 A1 | 9/1985 |
| JP | H08-054927 A | 2/1996 |
| JP | 2000-026096 A | 1/2000 |
| JP | 2001-034339 A | 2/2001 |

OTHER PUBLICATIONS

European Search Report EP21169058—Control of a Vehicle Via Reference Sensor Data, Jul. 21, 2021 (Year: 2021).*
Japanese Office Action Corresponding to 2021-026577 mailed Oct. 15, 2024.

* cited by examiner

Primary Examiner — Anne Marie Antonucci
Assistant Examiner — Jewel Ashley Kuntz
(74) Attorney, Agent, or Firm — Finch & Maloney PLLC

(57) ABSTRACT

A control method for a vehicle (101) in which the vehicle (101) is controlled manually while sensor data, from at least one sensor of the vehicle (101), is collected and stored. Then the vehicle (101) is controlled autonomously while sensor data, from the at least one sensor is detected and matched to the stored sensor data.

13 Claims, 2 Drawing Sheets

CONTROL OF A VEHICLE VIA REFERENCE SENSOR DATA

This application claims priority from German patent application serial nos. 10 2020 206 207.2 filed May 18, 2020 and 10 2020 210 351.8 filed Aug. 14, 2020.

FIELD OF THE INVENTION

The invention relates to a control, a computer program and a data processing device.

BACKGROUND OF THE INVENTION

The document DE 34 08 720 A1 discloses a trackless industrial truck for general cargo transport in work-sheds. The industrial truck consists of motorized vehicles with a steering drive and a control system which guides the vehicles along predetermined traffic lanes. To be able to drive the individual vehicles along arbitrarily selectable trajectories without elaborate setup work, the control system comprises either a plurality of positionally fixed transmitters and a receiver installed on each vehicle with a computer, or a transmitter installed on each vehicle with a receiver and at least two positionally fixed receivers arranged above ground level with a computer. The lanes of the vehicles are learned in that a human operator controls the vehicles manually as it travels along each lane. The data so generated are used as reference data in order to, during a later journey, determine the position of the vehicle by comparison with current sensor data and thus navigate the vehicle along the predetermined traffic lanes.

SUMMARY OF THE INVENTION

The purpose of the present invention is to improve the control of vehicles that travel autonomously or partially autonomously. This objective is achieved by a control method, a computer program and a data processing device according to the independent claim(s). Preferred further developments are described in the subordinate claims and emerge from the description given below and from the example embodiment illustrated in the figures.

The control method according to the invention serves to control a vehicle that drives autonomously or partially autonomously. A vehicle that drives autonomously or partially autonomously has one or more control units which control the vehicle at least partly autonomously, that is to say, without a human operator having to do anything.

Preferably, the vehicle controlled by the control method according to the invention is an industrial truck, for example a forklift truck.

The control method provides that at first the vehicle is controlled manually, i.e. by a human operator, for example a driver or a person acting upon the vehicle from outside the vehicle by remote means. During this, sensor data from at least one sensor of the vehicle is stored.

The invention provides that the stored sensor data is used as reference data for autonomous driving. In a corresponding process step the vehicle is controlled autonomously, i.e. without a human operator having to do anything. During this, the sensor data from the at least one sensor is recorded. The recorded data is compared with the stored data.

By virtue of the control method according to the invention a journey is learned manually, which is then replicated autonomously with reference to the compared sensor data. Compared with known methods this is advantageous in that recourse can be had to sensors of the vehicle which are already present in any case. It is not necessary to provide additional sensors in order to localize the vehicle in its surroundings.

In a preferred further development, as close as possible a match between the stored sensor data and the sensor data recorded during the autonomous control of the vehicle is striven for. The vehicle is controlled autonomously in such manner that the recorded sensor data match the stored sensor data. This means that the vehicle is controlled autonomously in such manner that a deviation of the sensor data recorded from the stored sensor data is as small as possible. This can be achieved, for example, by virtue of a measure for the deviation. For example, suitable as the measure of the deviation is the arithmetical mean of the differences of individual recorded and stored sensor data that correspond to one another. Preferably, the vehicle is controlled autonomously in such manner that the deviation is equal to zero, i.e. the recorded sensor data match the stored sensor data perfectly.

In an additional preferred further development, the sensor data stored while the vehicle is being controlled manually and the data which is detected during the autonomous journey and matched to the stored sensor data, consist of at least one movement variable of the vehicle or part thereof. Preferably, only movement variables of the vehicle or part thereof are detected and matched.

A movement variable of the vehicle or part of the vehicle is a physical variable that at least partially describes a movement of the vehicle or part of the vehicle. Corresponding sensors are for example accelerator pedal, working hydraulic, wheel rotational speed or steering angle sensors. By means of an accelerator pedal sensor, the position of an accelerator pedal is detected. By way of the position of the accelerator pedal position, the drive power of the vehicle can be influenced. A working hydraulic sensor detects a position of at least part of a working hydraulic system of the vehicle. Instead of such a sensor of the working hydraulics, the position of the part of the working hydraulic system, in particular a lifting device, can also be determined with reference to the actuation of corresponding valves of a hydraulic cylinder involved. A wheel speed sensor measures the rotational speed of a wheel of the vehicle. A steering angle sensor detects a steering angle, i.e. a rotational angle of a steering wheel of the vehicle or a turning angle of the wheels of a steerable axle of the vehicle.

This further development is advantageous because sensors for the detection of movement variables are comparatively inexpensive. Many such sensors are already present in conventional vehicles and do not have to be retrofitted. In particular the further development makes it possible to do without costly optical sensors.

In another preferred further development, a manually controlled movement sequence is reconstructed from the stored sensor data. The manually controlled movement sequence is a movement sequence carried out by the vehicle while it is under manual control. A movement sequence is understood to mean a sequence of movements of the vehicle relative to a positionally fixed reference system, for example a street or a building, and/or of one or more parts of the vehicle relative to a reference system positionally fixed on the vehicle, such as the vehicle body or a frame of the vehicle.

The autonomous control of the vehicle takes place in accordance with the previously reconstructed manually controlled movement sequence. During this the vehicle carries out the reconstructed movement sequence autonomously. It is controlled autonomously in such manner that it carries out the reconstructed movement sequence. This means that the autonomously controlled movement sequence matches the manually controlled movement sequence.

During this, however, it can also be provided that the control of the vehicle takes place in an automated manner instead of autonomously. This is understood to mean that it can be provided that the vehicle carries out the previously reconstructed, manually controlled movement sequence, but that an operator exercises a monitoring function. In particular, an operator could react to (unexpected or unplanned) obstacles and dangerous situations. In that way the implementation of the function can take place particularly simply, since no additional sensors for obstacle recognition have to be provided. Consequently, the automated control of the vehicle can be regarded as an assisted driving function or driver-assistance function or system, which uses sensor signals from already present sensors.

In an extension, the output of a warning message is provided for in the event that an impermissible deviation of an actual value from a target value is recognized. As an example, in this connection an unexpected slippage value at a wheel or a locked wheel can be mentioned. The emission of a warning message enables the operator, in the event of some impermissible deviation, to take corrective action or to terminate the performance of autonomous control and thus take over manual control. Furthermore, with a corresponding configuration the automatic control of the vehicle can be discontinued automatically instead of by the operator if an impermissible deviation is recognized. Here, the term 'impermissible deviation' describes a deviation that goes beyond a tolerance value. The tolerance value can even be zero and consequently any deviation, however small, will be impermissible.

The starting positions of the vehicle at the beginning of the manually controlled movement sequence and the autonomously controlled movement sequence are preferably the same. This means that before the movement sequence is carried out autonomously, the vehicle drives to the position that it occupied at the beginning of the manually controlled movement sequence.

In accordance with a further development, the vehicle carries out the autonomously controlled movement sequence beginning at a starting position of the reconstructed movement sequence. As a result, the autonomous control of the vehicle exactly follows the previously predetermined manual control.

In a further development it can be provided that the autonomously controlled movement sequence also includes actuation of a lifting device or a working hydraulic system. Accordingly, it would not be only the path between a starting position and an end position that is detected, but also the process and actuation of a working hydraulic system. In particular, by means of industrial trucks a load can be moved from one place to another. For that purpose, industrial trucks usually comprise a lifting device actuated by a working hydraulic system or in some other way, by means of which loads can be picked up and put down. Typically, industrial trucks have a lifting mast to which a fork for taking up pallets, containers or other piece goods/containers is attached. In that way loads can be picked up at one place, transported to another place and deposited there.

Once the vehicle has reconstructed the manually controlled movement sequence from the stored sensor data, in an alternative preferred further development it carries this out the other way round. Thus, the vehicle is controlled autonomously in such manner that it carries out the manually controlled movement sequence in the opposite direction. This means that the movements of the manually controlled movement sequence are carried out in the reverse sequence, in each case with the sign reversed. Thereby, the individual movements are carried out in each case in the opposite movement direction but at the same speed.

The further development brings about an autonomous reversed journey of the vehicle. During the reversed journey the vehicle follows in the opposite direction a previous trajectory already covered under manual control. This is advantageous because the driver is relaxed and the risk that the vehicle might collide with an obstacle is reduced.

As regards the actuation of the lifting device, the control system can be extended by an adaptation function when the reversed movement sequence is carried out. The adaptation function causes the working hydraulic system or the lifting device to be actuated, but not exactly oppositely to the previous movement sequence. Rather, the working hydraulic system or the lifting device first remains in the last condition it was in after the unloading process, for example so that the fork can be extracted from the pallet when the reversed movement sequence is carried out. Without taking the adaptation function into account, after the lifting device has been lowered to deposit the load the lifting device would immediately be raised again, which would result in lifting the load again.

Alternatively or in addition the adaptation function can be designed such that with reference to a detected path length it is determined whether the fork is still in or under the load. As soon as the reversed path becomes longer during the reversing that the length of the fork, the working hydraulic system or lifting device is actuated as in the previously described, reversed movement sequence. During this it can also be provided that the reversed movement sequence of the working hydraulic system or the lifting device takes place more rapidly than the carrying out of the reversed movement sequence for the driving function of the industrial truck. Thereby, the offset of the actuation of the lifting device or the working hydraulic system caused by the adaptation function can be compensated for. It can also be provided that after the adaptation function has ended, the carrying out of the reversed movement sequence for the driving function is suspended, paused or made slower until the offset has been compensated for by the adaptation function. In other words, this ensures that the offset between driving parameters and working hydraulics parameters is minimized to an acceptable level or even completely eliminated.

By analogy, an adaptation function can also be provided by virtue of which the working hydraulic system or the actuation of the lifting device are provided with an offset in the same way after taking up a load. This prevents the load taken up from being put down/deposited when the reversed movement sequence is carried out. The offset can be taken into account in the form of a variable or constant parameter.

Instead of actuating the adaptation function on the basis of a path travel evaluation the adaptation function can also be triggered manually, for example when the operator actuates a corresponding input element or switch.

Furthermore, it can also be provided that a hybrid function is carried out. This means that the autonomous reverse journey is carried out by the vehicle or a corresponding control system while the actuation of the working hydraulics or the lifting device by the operator is taking place.

Often, loads are taken up or deposited at storage sites that provide only little space for maneuvering and for bringing the load in or removing it. As an example a high-bay warehouse with narrow storage sites can be mentioned.

Consequently the uptake or deposition of the load demands close attention on the part of the operator when actuating the working hydraulic system and the lifting device. Accordingly, it can also be provided that the reversed movement sequence is at first carried out at lower speed. This can either be specified by the automatic control system or commanded by the operator. As soon as the load has been recovered from the storage site concerned, the speed at which the reversed movement sequence is carried out can be increased.

In a further development it is provided that the operator can terminate or overrule the carrying out of the reversed movement sequence at any time by actuating an accelerator pedal, a brake pedal, the working hydraulic system or the lifting device, and/or by a steering intervention.

Furthermore, in addition a limiting function can be assigned to an accelerator pedal or a brake pedal, so that depending on its actuation condition the reversed movement sequence takes place at a different speed. In a possible alternative version, by means of a separate input element the reduced speed at which the reversed movement sequence is carried out can be adapted continuously in a range from 0% to 100%.

In a similar manner, an increase of the speed at which the reversed movement sequence is carried out to values higher than 100% can take place, in order to carry out the function more quickly. Instead of a separate input element, this function can also be temporarily assigned to an accelerator and/or brake pedal.

In a preferred further development, after the reversed journey the position of the vehicle corresponds to the above-described position of the vehicle at the beginning of the autonomously controlled movement sequence. This implies that a position of the vehicle when the autonomously controlled movement sequence begins, corresponds to the above-described end position of the manually controlled movement sequence.

In accordance with the further development, the manually controlled movement sequence and the autonomously controlled movement sequence match one another but with the sign changed.

A computer program according to the invention serves to carry out the method according to the invention or a preferred further development thereof. The computer program is designed to enable a data processing device to carry out the method according to the invention or a preferred further development thereof when it is implemented on the data processing device.

A data processing device according to the invention is designed to carry out the method according to the invention or a preferred further development thereof. For example, a data processing device that contains the computer program according to the invention is adapted in such a manner. In particular that is the case when the computer program has been loaded into a working memory of the data processing device for that purpose.

BRIEF DESCRIPTION OF THE DRAWINGS

A preferred example embodiment of the invention is illustrated in the figures, in which matching indexes denote the same or functionally equivalent features. In detail, the figures show.

DETAILED DESCRIPTION OF THE PREFERRED EMBODIMENTS

Figure 1:
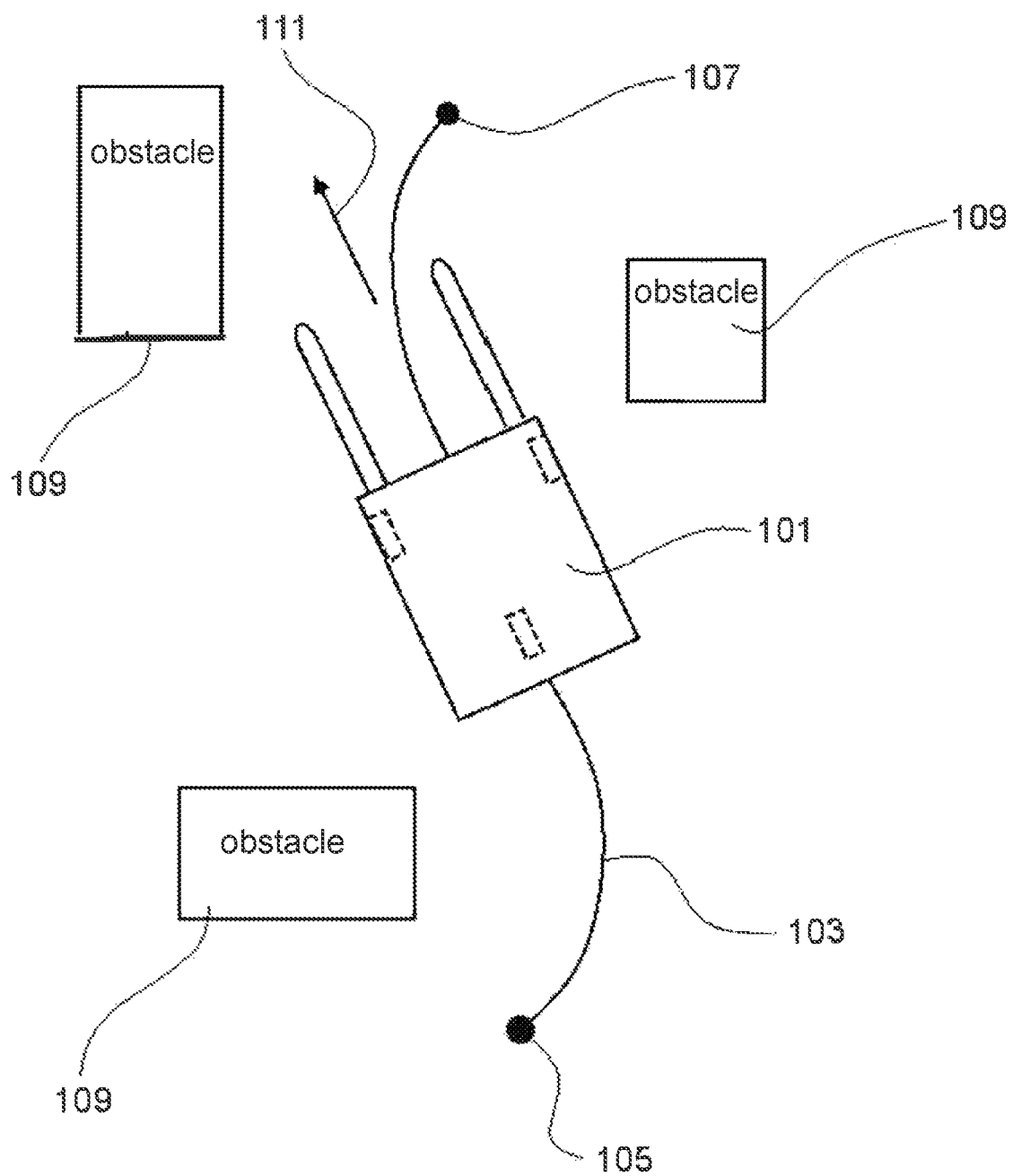
FIG. 1: A forklift truck driving forwards.

A forklift truck 101 illustrated in FIG. 1 is driving along a trajectory 103. The trajectory 103 leads from a starting point 105 to an end point 107. Thus, the forklift truck 101 begins at the starting point 105 and follows along the trajectory 103 to the end point 107.

The trajectory 103 is chosen such that the forklift truck 101 passes between obstacles 109. During this it drives forward in a first travel direction 111.

While the forklift truck 101 is moving along the trajectory 103, the data from its sensors is collected and stored. When the forklift truck 101 has reached the end point 107, it reverses.

Figure 2:
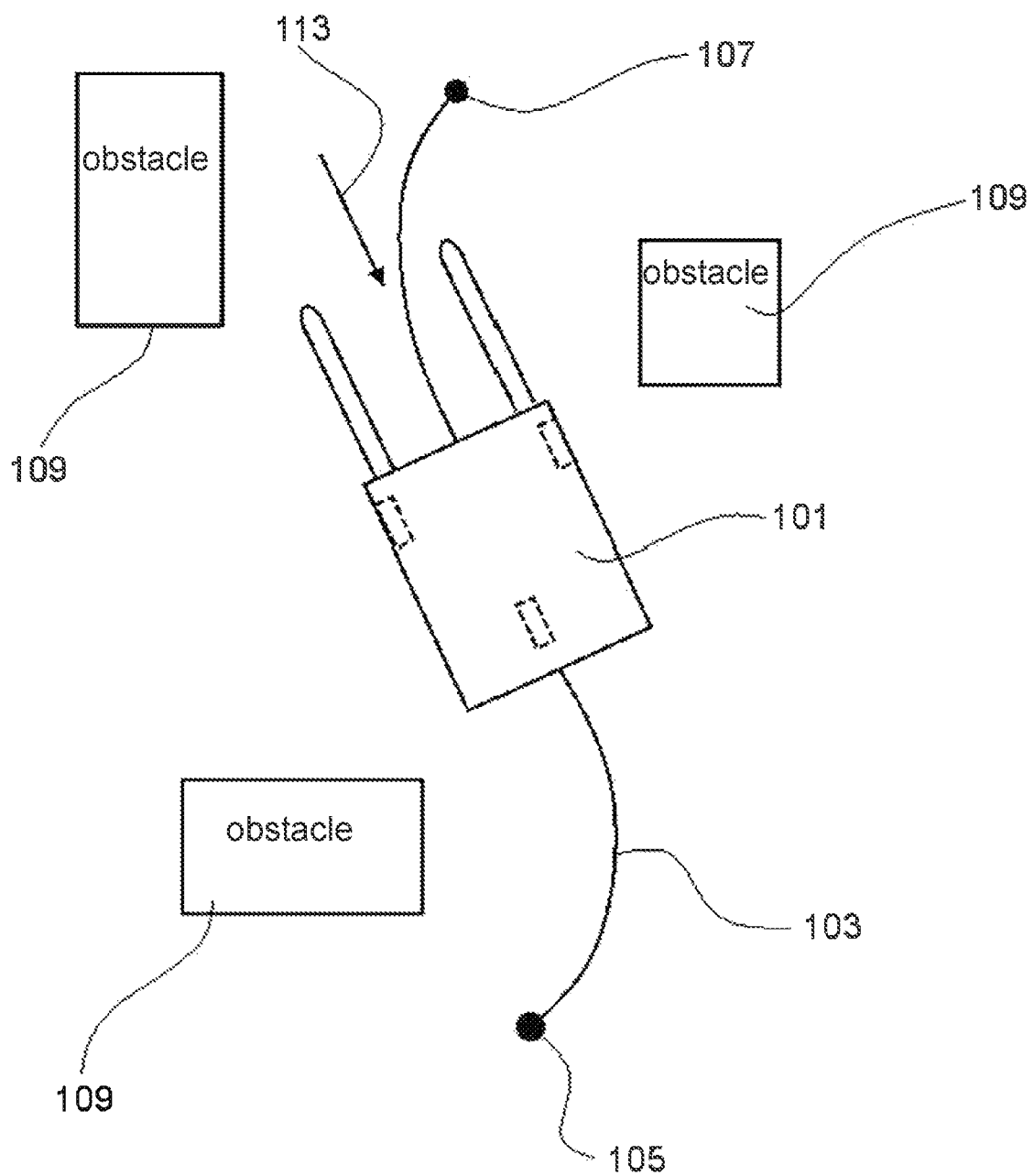
FIG. 2: A forklift truck driving in reverse.

After its reversal, as shown in FIG. 2 the forklift truck 101 moves backward in a second travel direction 113 along the same trajectory 103. During this, for orientation purposes the forklift truck makes use of the sensor data collected during the forward journey. It compares these senor data with corresponding sensor data which it detects during the reverse journey. The forklift truck 101 determines its trajectory 103 during the reverse journey in such manner that the sensor data is a quantitative match.

INDEXES

101 Forklift truck
103 Trajectory
105 Starting point
107 End point
109 Obstacle
111 First travel direction
113 Second travel direction

The invention claimed is:

1. A control method for controlling operation of a forklift truck having a working hydraulic system which controls actuation of a lifting device designed to engage with one of a pallet, a container or goods to be transported, the control method comprising:
   initiating manual control, by a human operator, of the forklift truck at a start point;
   engaging the lift device with the pallet, the container or the goods to be transported at the start point;
   transporting the pallet, the container or the goods to be transported, by the forklift truck, during a forward movement sequence along a travel trajectory in a forward travel direction under manual control, from the starting point to an end point;
   depositing the pallet, the container or the goods to be transported at the end point;
   storing sensor data from at least one sensor of the forklift truck while the forklift truck is manually controlled by the human operator along the travel trajectory, in the forward travel direction, from the starting point to the end point;
   also storing sensor data concerning actuation of the working hydraulic system controlling actuation of the lifting device during the travel trajectory, in the forward travel direction, from the starting point to the end point;
   thereafter initiating autonomous control of the forklift truck, during a reverse movement sequence of the forklift truck (101) along the travel trajectory, in a reverse travel direction, from the end point to the starting point, based upon sensor data of the forklift truck, which is detected and compared with the stored sensor data; and
   offsetting control of the lift device, along the travel trajectory in the reverse travel direction, until the lift device is extracted from the pallet, the container or the goods that were transported and deposited at the end point.

2. The control method according to claim 1 further comprising,
autonomously controlling the forklift truck in such a manner that the detected sensor data is matched to the stored sensor data.

3. The control method according to claim 1 further comprising,
detecting and storing at least one movement variable of the forklift truck or a part of the forklift truck as the sensor data, with the at least one movement variable including a variable unrelated to movement of the forklift truck along the travel trajectory of the forklift truck.

4. The control method according to claim 1 further comprising,
reconstructing the reverse movement sequence of the forklift truck, from the stored sensor data, such that the forklift truck autonomously follows the reverse movement sequence from the end point to the starting point.

5. The control method according to claim 4, wherein
the forklift truck follows the reconstructed reverse movement sequence along the recorded travel trajectory beginning from the starting point to the end point, and then moves along the recorded travel trajectory from the end point to the starting point.

6. The control method according to claim 1 further comprising,
reconstructing the reverse movement sequence of the forklift truck from the stored sensor data; and
the forklift truck follows the reverse movement sequence in a reverse travel direction.

7. The control method according to claim 6, wherein,
the forklift truck follows the reverse movement sequence beginning from the end point of the reverse movement sequence, and
offsetting actuation of the lift device when the reverse movement sequence is carried out until a reverse path length in the reverse travel direction becomes longer than the length of a fork of the lift device.

8. A data processing device having a working memory loaded with a computer program which when implemented by the data processing device controls operation of a forklift truck according to the method of claim 1, the data processing device implementing the computer program autonomously controls the forklift truck while sensor data from the at least one sensor is detected and compared with the stored sensor data.

9. A data processing device designed to carry out the method according to claim 1, the data processing device having a working memory into which a computer program is loaded to implement the method.

10. The control method according to claim 1 further comprising, with the at least one sensor of the forklift truck detecting, as the sensor data, at least one of:
an accelerator pedal position,
a position of a part of the working hydraulic system,
a vehicle wheel rotational speed,
a steering wheel rotational speed, and
a turning angle of wheels of a steerable axle.

11. The control method according to claim 1 further comprising, autonomously controlling the forklift truck to move in the forward movement direction along the recorded travel trajectory from the starting point to the end point, and then to move in the reverse movement direction along the recorded travel trajectory from the end point to the starting point.

12. A method for controlling operation of a forklift truck having a working hydraulic system which controls actuation of a lifting device designed to engage with one of a pallet, a container or goods to be transported, the control method comprising:
initiating manual control, by a human operator, of the forklift truck at a start point;
engaging the lift device with the pallet, the container or the goods to be transported at the start point;
transporting the pallet, the container or the goods to be transported, by the forklift truck, during a forward movement sequence along a travel trajectory in a forward travel direction under manual control by the human operator, from the starting point to an end point;
depositing the pallet, the container or the goods to be transported at the end point;
storing sensor data from at least one sensor of the forklift truck while the forklift truck is manually controlled by the human operator along the travel trajectory, in the forward travel direction, from the starting point to the end point;
also storing sensor data concerning actuation of the working hydraulic system controlling actuation of the lifting device during the travel trajectory, in the forward travel direction, from the starting point to the end point;
after depositing the pallet, the container or the goods to be transported at the end point, initiating autonomously control of the forklift truck, during a reverse movement sequence of the forklift truck along the travel trajectory, in a reverse travel direction, from the end point to the starting point, based upon sensor data of the forklift truck, which is detected and compared with the stored sensor data;
offsetting actuation of the lift device, along the travel trajectory in the reverse travel direction, until the lifting device is extracted from the pallet, the container or the goods that were transported and deposited at the end point; and
permitting the operator to terminate or overrule the reversed movement sequence, at any time, by actuating an accelerator pedal, a brake pedal, the working hydraulic system, the lifting device or by steering intervention.

13. The control method according to claim 12 further comprising, with the at least one sensor of the forklift truck, detecting, as the sensor data, at least one of:
an accelerator pedal position,
a position of a part of the working hydraulic system,
a vehicle wheel rotational speed,
a steering wheel rotational speed, and
a turning angle of wheels of a steerable axle.

* * * * *